(12) United States Patent
Slobinsky et al.

(10) Patent No.: US 11,946,690 B2
(45) Date of Patent: Apr. 2, 2024

(54) SYSTEM FOR ACCESSING BIOLOGICAL SAMPLES IN A CRYOGENIC DEWAR VESSEL

(71) Applicant: National Scientific and Technical Research Council—Argentina (CONICET), Caba (AR)

(72) Inventors: Demian Gustavo Slobinsky, Buenos Aires (AR); Juan Pablo Peralta, La Plata (AR)

(73) Assignee: National Scientific and Technical Research Council—Argentina (CONICET), Caba (AR)

( * ) Notice: Subject to any disclaimer, the term of this patent is extended or adjusted under 35 U.S.C. 154(b) by 303 days.

(21) Appl. No.: 17/431,367

(22) PCT Filed: Feb. 17, 2020

(86) PCT No.: PCT/IL2020/050177
§ 371 (c)(1),
(2) Date: Aug. 16, 2021

(87) PCT Pub. No.: WO2020/165909
PCT Pub. Date: Aug. 20, 2020

(65) Prior Publication Data
US 2022/0136754 A1    May 5, 2022

Related U.S. Application Data

(60) Provisional application No. 62/806,833, filed on Feb. 17, 2019.

(51) Int. Cl.
*F25D 3/10*    (2006.01)
*F25D 25/04*   (2006.01)
*G01N 1/42*    (2006.01)

(52) U.S. Cl.
CPC ............ *F25D 3/102* (2013.01); *F25D 25/04* (2013.01); *G01N 1/42* (2013.01)

(58) Field of Classification Search
CPC ........ F25D 25/04; G01N 1/42; A01N 1/0257; A01N 1/0268
(Continued)

(56) References Cited

U.S. PATENT DOCUMENTS 5,233,844 A * 8/1993 Knippscheer ......... F25D 29/001
                                                414/331.05
9,554,572 B2   1/2017 Katkov et al.
(Continued)

FOREIGN PATENT DOCUMENTS

CN   109699635 A    5/2021
JP   2017013957 A   1/2017
WO   2015085287 A1  6/2015

OTHER PUBLICATIONS

Supplementary European search report for PCT/IL2020/050177 dated Mar. 11, 2022.
(Continued)

*Primary Examiner* — Steve S Tanenbaum
(74) *Attorney, Agent, or Firm* — The Roy Gross Law Firm, LLC; Roy Gross (57) ABSTRACT

A cryogenic device for storing biological material containers comprises: a sealed cryogenic Dewar vessel; (b) a matrix of receptacles disposed in an inner space of the cryogenic Dewar vessel and configured for receiving and storing biological material containers; (c) means for loading and retrieving the biological material containers. The loading/retrieving means comprises a telescopic cane manipulator configured for loading and retrieving the biological material containers within the matrix. The receptacles are carried by a carousel member rotatable around an axis thereof. The receptacles are arranged into a number of groups distributed (Continued)

over the carousel member. Each group of the receptacles has a central point positioned at distance $R_1$ from the rotation axis of the carousel member. a center of each receptacle within the group is positioned around a central point thereof at distance $R_2$.

9 Claims, 8 Drawing Sheets

(58) Field of Classification Search
USPC .......................................................... 62/62
See application file for complete search history.

(56) References Cited

U.S. PATENT DOCUMENTS

| | | |
|---|---|---|
| 2010/0281886 A1 | 11/2010 | Shaham et al. |
| 2014/0007596 A1 | 1/2014 | Prester et al. |
| 2014/0335554 A1 | 11/2014 | Larson et al. |
| 2018/0024032 A1 | 1/2018 | Hollabaugh et al. |

OTHER PUBLICATIONS

International Search Report for PCT patent application No. PCT/IL2020/050177 dated May 17, 2020, 5 pp.
International Written Opinion for PCT patent application No. PCT/IL2020/050177 dated May 17, 2020, 5 pp.
International Preliminary Report on Patentability for PCT patent application No. PCT/IL2020/050177 dated May 17, 2020, 10 pp.

* cited by examiner

SYSTEM FOR ACCESSING BIOLOGICAL SAMPLES IN A CRYOGENIC DEWAR VESSEL

This is a National Phase Patent Application of PCT Patent Application PCT/IL2020/050177 filed Feb. 17, 2020, which claims the benefit of priority to U.S. Provisional Patent Application No. 62/806,833 filed Feb. 17, 2019. The contents of both applications are all incorporated by reference herein in their entirety.

FIELD OF THE INVENTION

Present invention relates to cryogenic equipment and, more particularly to cryopreservation systems for conserving reproductive cells and embryos.

BACKGROUND OF THE INVENTION

The most widely spread cryopreservation systems used in assisted reproduction techniques are cryogenic Dewar vessels. These Dewar vessels store liquid nitrogen which provides the cryogenic environment for reproductive cells and embryos to be conserved over time. The head of the Dewar vessels is not sealed at their top to prevent high pressure build up by allowing for slow liquid nitrogen evaporation vent to the ambient.

Sealed Dewar vessels are not common practice because a cooling system must be attached to avoid high pressures. When a cooling system is chosen, it is usually built in a separate chamber that hosts the liquid N2 or Helium in the case of NMR and not the samples. In this way, the samples are kept in a cryogenically dry environment There are several procedures to avoid mix-parent accidents. The main ways of labelling are based in the use of RFID or bar-codes that are read upon preparation or extraction at room temperature, but also a great amount of handwriting tagging is still of common practice.

In the present, the patient of an assisted reproductive treatment does not pose updated information of its biological samples state. It is then desirable from the patient point of view to hold control over its biological assets and to obtain updated reports of its sample state and procedures.

US 20100281886 discloses a system and a method for cryopreserving a liquid biological material disposed in a bag having a longitudinal axis. The system comprises a bag holder for holding the bag, so that the biological material therein has a surface area S, and a volume V, a tank containing a cryogenic fluid, a mechanism for the immersion of the bag holder into the tank along the longitudinal axis, an opening in the tank for insertion therethrough of the bag holder, and a guide member extending from the opening into the tank. There are further provided a system and a method for warming a cryopreserved liquid biological material disposed in a bag. The system comprises a heat source, a warming device having a space for placing the bag therein, connected to the heat source and adapted to transfer heat from the heat source to the bag, and means for maintaining the heat source in heat transfer contact with a cryogenically preserved portion of the material to allow receiving the heat by said cryogenically preserved portion.

Placing and withdrawing the biological material are performed in a blind manner. Only after taking the biological material out, a user is able to visually identify the withdrawn biological material. Placing and withdrawing the biological material includes a multistep procedure. Thus, there is a long-felt and unmet need for providing a cryopreservation system for conserving reproductive cells and embryos characterized by a visually controlled (internal camera) automatic manipulation stage provided by a telescopic cane on a positioning stage which simplifies the aforesaid placing/withdrawing procedure.

SUMMARY OF THE INVENTION

It is hence one object of the invention to disclose a cryogenic device for storing biological material containers. The aforesaid device comprises: (a) a sealed cryogenic Dewar vessel accommodating a liquefied gas in an inner space thereof; (b) a matrix of receptacles disposed the inner space and configured for receiving and storing biological material containers; (c) means for loading and retrieving the biological material containers; the means comprising a telescopic cane manipulator configured for loading and retrieving the biological material containers within the matrix; the means comprising an airlock isolating the inner space from an outer environment surrounding the sealed cryogenic Dewar vessel; the airlock is configured for passing the biological material containers manipulated by the telescopic cane manipulator therethrough in a sealed manner.

It is a core purpose of the invention to provide the receptacles are carried by a first carousel member rotatable around an axis thereof; the receptacles are arranged into a number of groups distributed over the carousel member. Each group of the receptacles has a central point positioned at distance $R_1$ from the rotation axis of the carousel member; a center of each receptacle within the group is positioned around a central point thereof at distance $R_2$. The telescopic cane manipulator is rotatable around an axis disposed at $R_1$ from the rotation axis of the carousel member on an arm of $R_2$ length such that providing coincidence between the rotation axis of the telescopic cane manipulator with the central point of a receptacle group of interest, a receptacle of interest is loadable or retrievable by the telescopic cane manipulator by rotation thereof around the axis thereof on the $R_2$ arm.

Another object of the invention is to disclose device comprising a second carousel member having identically arranged receptacles thereon and rotatably mounted under the first carousel member in a coaxial manner; the first and second carousel members are rotatable in an independent manner; the first carousel member has a cut configured for providing an access to the receptacles carried by the second carousel member.

A further object of the invention is to disclose at least one the group of receptacles arranged within a canister releasably connectable thereto the carousel member.

A further object of the invention is to disclose the sealed cryogenic Dewar vessel comprising a quick-opening hatch providing an emergency access to the biologic material containers.

A further object of the invention is to disclose device comprising a cooled head thermally connected to a cryocooler. The cooled head maintains the liquefied gas in a liquid state.

A further object of the invention is to disclose the cryocooler comprises pressure and temperature gauges configured for activating and deactivating the cryocooler.

A further object of the invention is to disclose the device comprising a level indicator of the liquefied gas further a float and a camera configured for imaging the float.

A further object of the invention is to disclose the device comprising an authorization unit configured for identifying and manipulating the containers conditioning a permission of a legally authorized person.

A further object of the invention is to disclose a method of loading, storing and retrieving biological material containers is disclosed. The aforesaid method comprises steps of: (a) providing a device for storing biological material containers; the device comprising: (i) a sealed cryogenic Dewar vessel accommodating a liquefied gas in an inner space thereof; (ii) a matrix of receptacles disposed the inner space and configured for receiving and storing biological material containers; (ii) means for loading and retrieving the biological material containers; the means comprising a telescopic cane manipulator configured for loading and retrieving the biological material containers within the matrix; the means comprising an airlock isolating the inner space from an outer environment surrounding the sealed cryogenic Dewar vessel; the airlock is configured for passing the biological material containers manipulated by the telescopic cane manipulator therethrough in a sealed manner; the receptacles are carried by a first carousel member rotatable around an axis thereof; the receptacles are arranged into a number of groups distributed over the carousel member; each group of the receptacles has a central point positioned at distance $R_1$ from the rotation axis of the carousel member; a center of each receptacle within the group is positioned around a central point thereof at distance $R_2$; the telescopic cane manipulator is rotatable around an axis disposed at $R_1$ from the rotation axis of the carousel member on an arm of $R_2$ length such that providing coincidence between the rotation axis of the telescopic cane manipulator with the central point of a receptacle group of interest, a receptacle of interest is loadable or retrievable by the telescopic cane manipulator by rotation thereof around the axis thereof on the $R_2$ arm; (b) inserting the biological material container into the inner space via the airlock; (c) cooperatively rotating the carousel member and the telescopic cane manipulator such that the receptacle of interest is available for placing the biological material container within the receptacle of interest; (d) placing the biological material container within the receptacle of interest; (e) storing the biological material container within the receptacle of interest; (f) cooperatively rotating the carousel member and the telescopic cane manipulator such that the biological material container in the receptacle of interest is available for retrieving the biological material container from the receptacle of interest; (g) retrieving the biological material container from the receptacle of interest; (h) outing the biological material container from the inner space via the airlock.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide a cryogenic device and a method of placing, storing and withdrawing biological material items.

This invention provides a convenient way to load and retrieve biological samples into canisters for cryopreservation lowering the risk of mix-parents fertilization and providing update information of the procedure to the patient which holds a digital key to give consent to the extraction of its samples. It also records into the chain block of the medical procedure the identification of the extracted or loaded vial.

Figure 1:
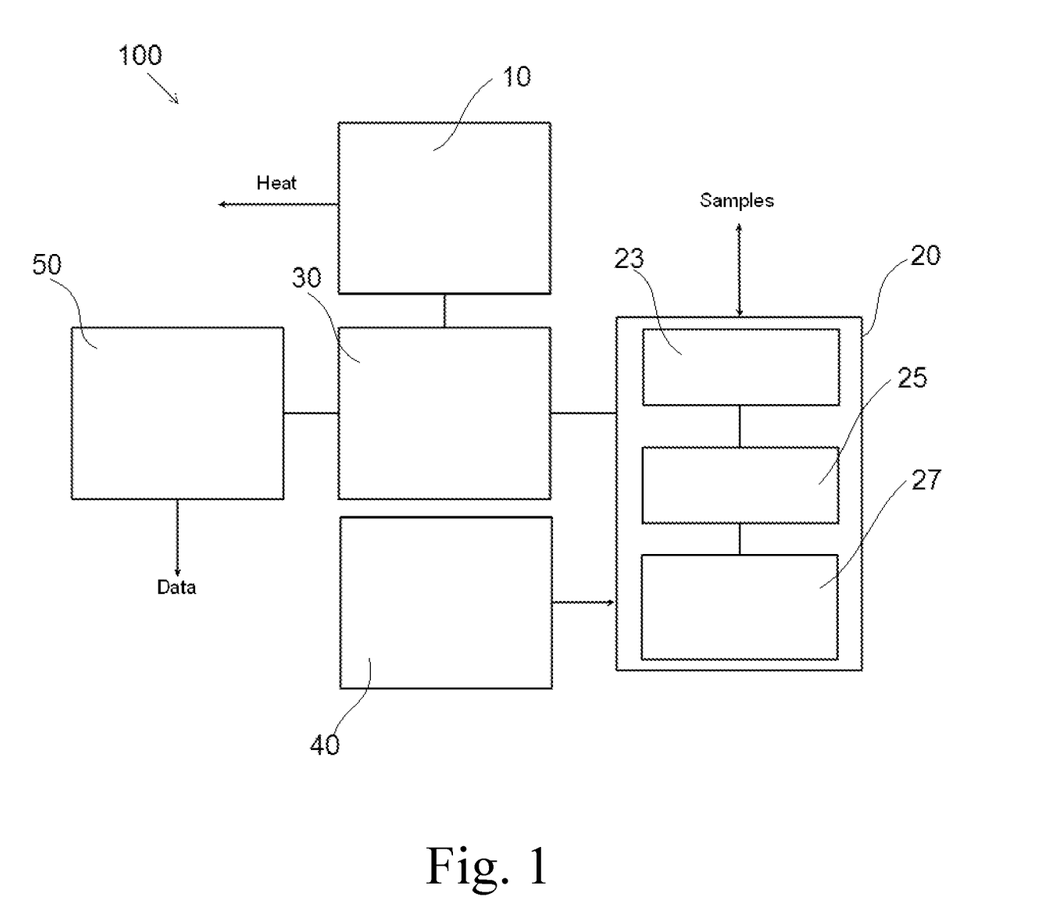
FIG. 1 is a structural diagram of a cryogenic device for storing biological material items.

Reference is now made to FIG. 1 presenting a structural diagram of system 100 including five subsystems. The main subsystem is Dewar vessel 30 where the cryogenic environment is maintained. Dewar vessel 30 interacts with cryocooler 10, the manipulation and the monitor subsystems 20 and 50, respectively. Each of these subsystems has its own input/output. Cryocooler 10 interacts with the Dewar vessel 30 by extracting heat. Manipulation system 20 is aimed to introduce and extract samples and interacts with subsystem 40 that issues permissions to enable the automatic manipulation system through the consent of patients. Monitor system 50 extracts data of the cryogenic state of Dewar vessel 30 to keep track of its performance over time and to yield alarms when necessary.

Reference is now made to FIGS. 2 to 8 presenting the aforesaid five subsystems in detail.

Figure 2:
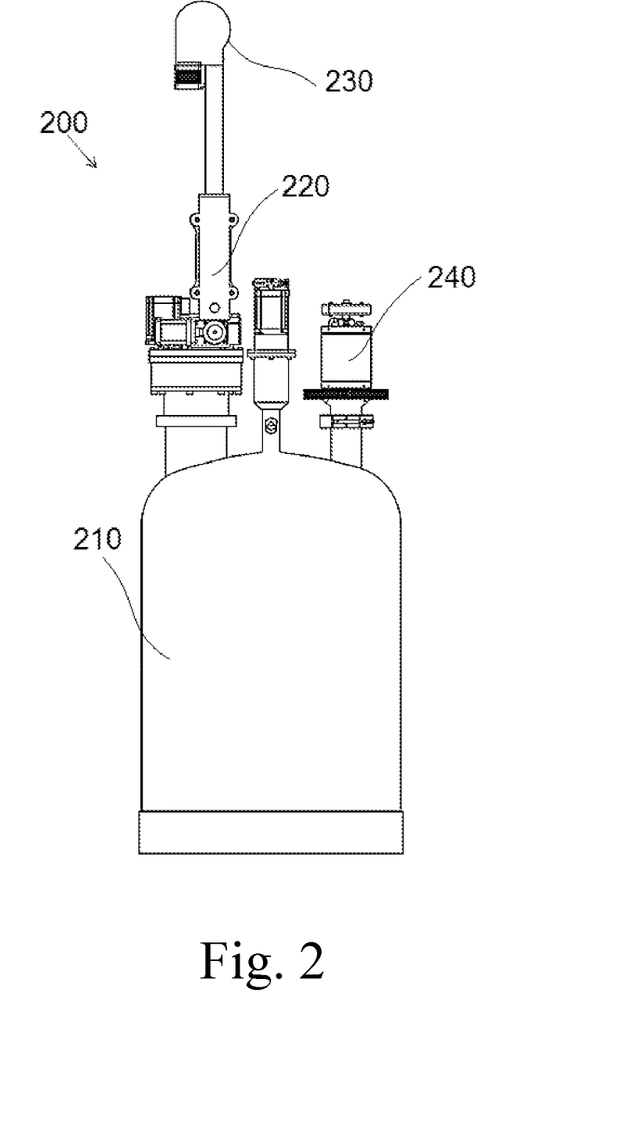
FIG. 2 is a general outer view of a cryogenic device for storing biological material items.
Figure 3:
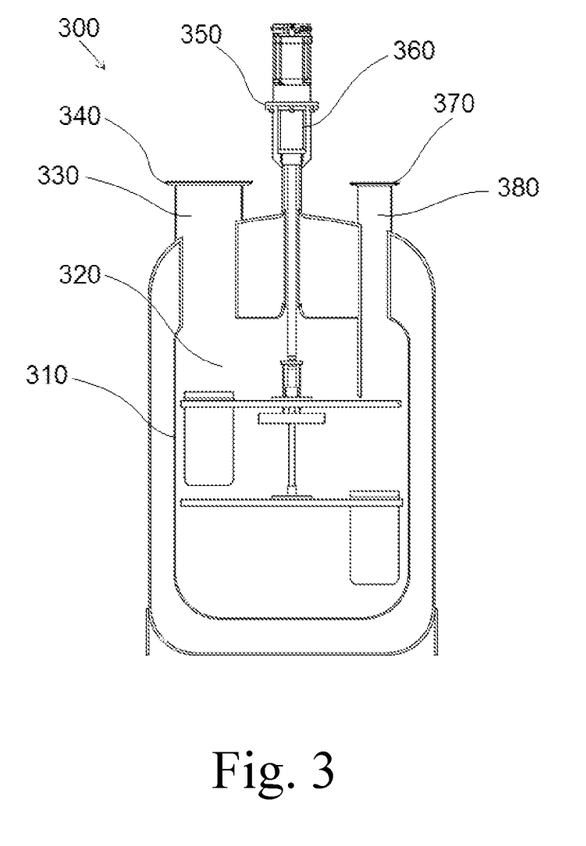
FIG. 3 is a cross-sectional view of a cryogenic device for storing biological material items.

The cryogenic Dewar vessel is depicted in FIG. 2. The cryogenic liquid compartment (310) is sealed using adequate rubber o-rings and seals in grooves machined in flanges sealing ports (340), (350) and (370).

The sealed cryogenic chamber avoids the need to defrost Dewar vessel from ambient water converted into ice on it, giving a superior thermal performance and less maintenance to the whole set-up. However, a sealed chamber imposes a severe constraint to the sample place and retrieval mechanism concerning sample manipulation and thermal budget equilibrium at the time of inserting the sample manipulation mechanism.

The flange (720) is clamped to the hatch's flange (340). This allows for a rapid extraction of canisters (410) in case of catastrophic failure of the Dewar vessel (210) that reduces the risk of thawing samples in this event.

The cryogenic Dewar vessel (210) is connected to a cryocooler (240) of the Stirling, pulse-tube, Gifford-Mcmahon or Kleemenko type. This assembly is made with a specially designed flange joining the cryocooler with the Dewar vessel at one of the off-centered hatches (380) using a clamp.

Pressure slowly builds up in the sealed compartment upon evaporation. A pressure gauge (510) and a temperature gauge (590) actively determine when the cryocooler is turn on and off from a pre-defined threshold. At a predefined set pressure (or equivalently temperature), the cryocooler liquefies the nitrogen vapor by contacting it with its cold head (580) to ensure the cryogenic temperature of samples.

In the ideal case, liquid nitrogen is never vented out of the cryogenic chamber and hence no refill is ever needed.

Figure 4:
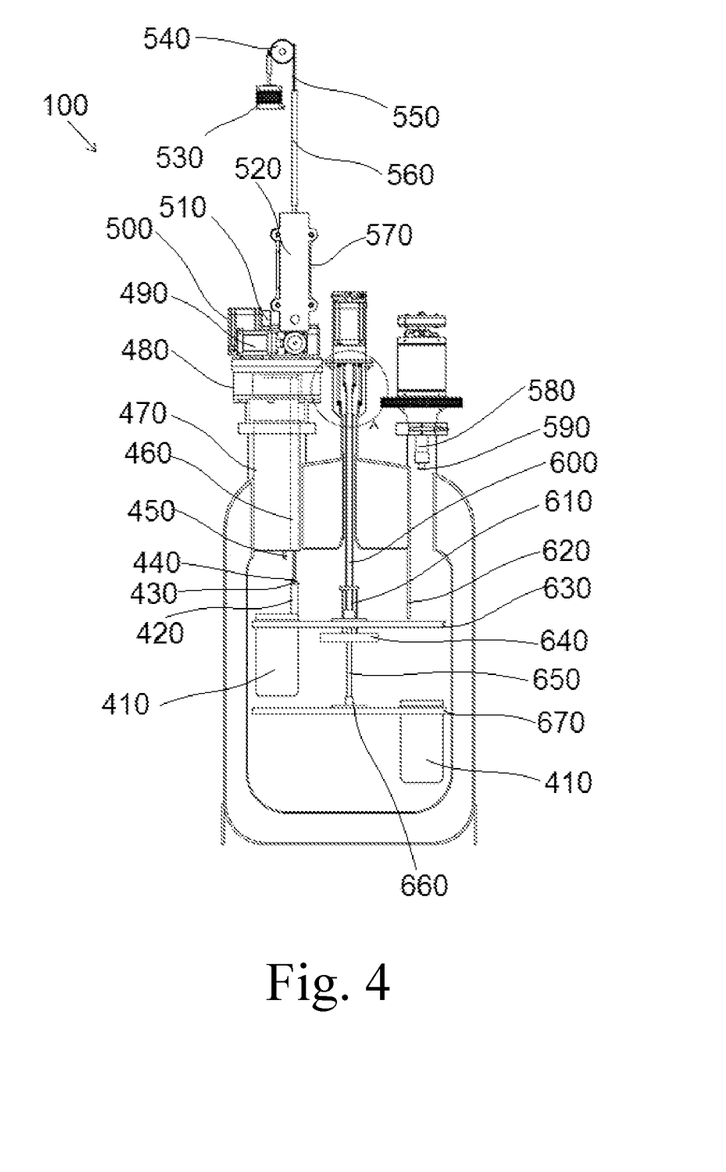
FIG. 4 is a cross-sectional view of a cryogenic device for storing biological material items.
Figure 5:
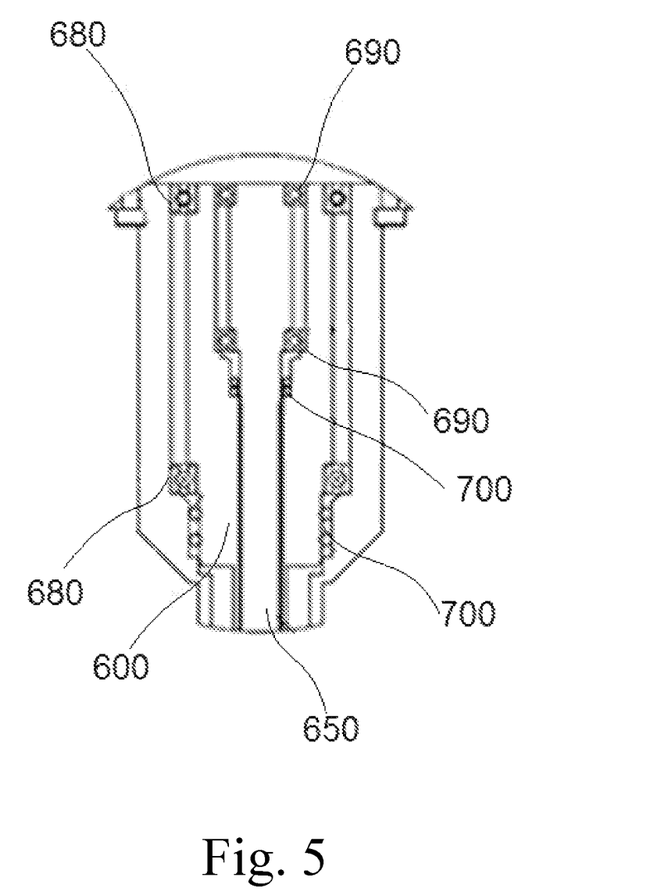
FIG. 5 is a cross-sectional view of a cryo-cooler assembly.
Figure 6A:
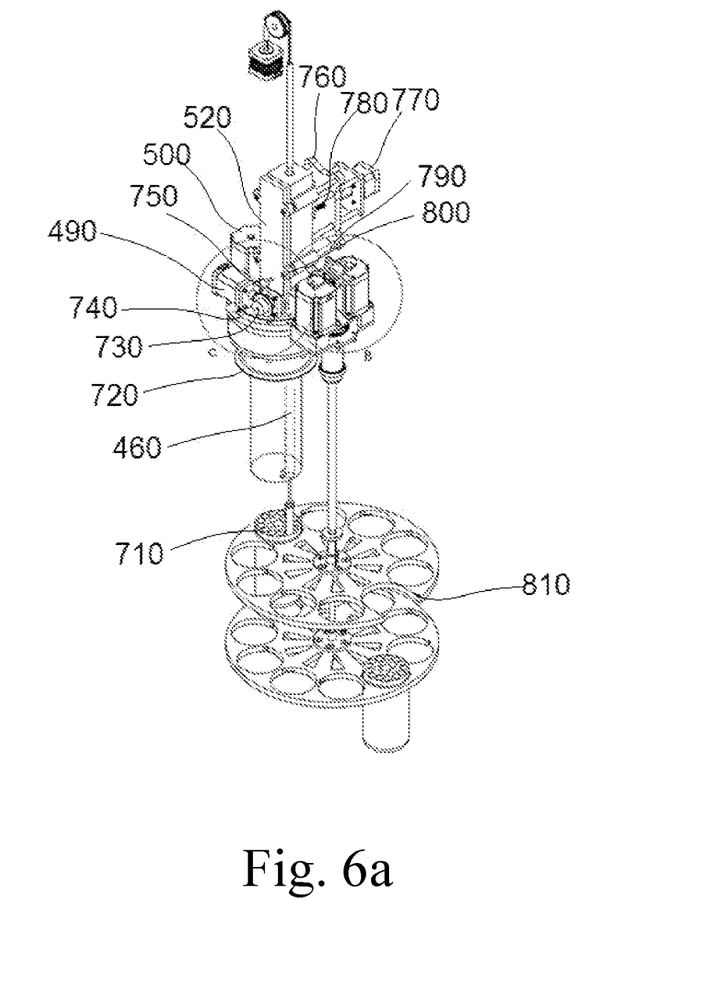
FIGS. 6a to 6c are detailed views of the automatic placement and retrieval unit in action.
Figure 6B:
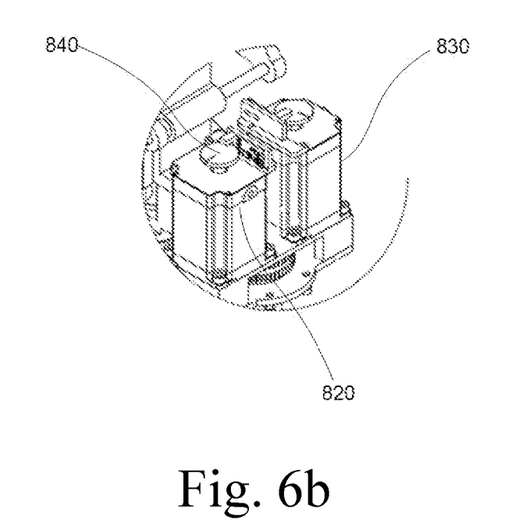
Figure 6C:
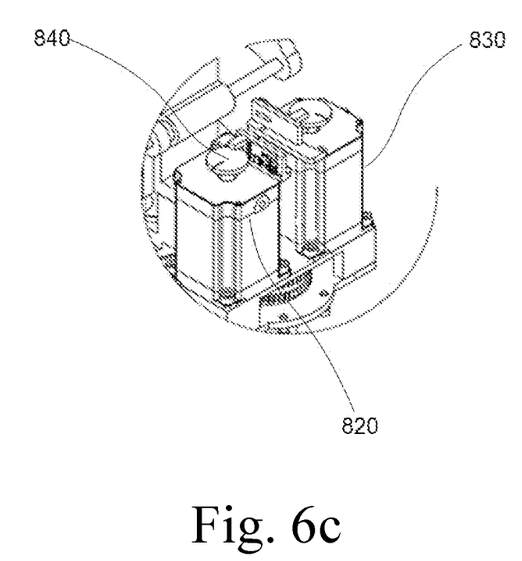
Figure 7A:
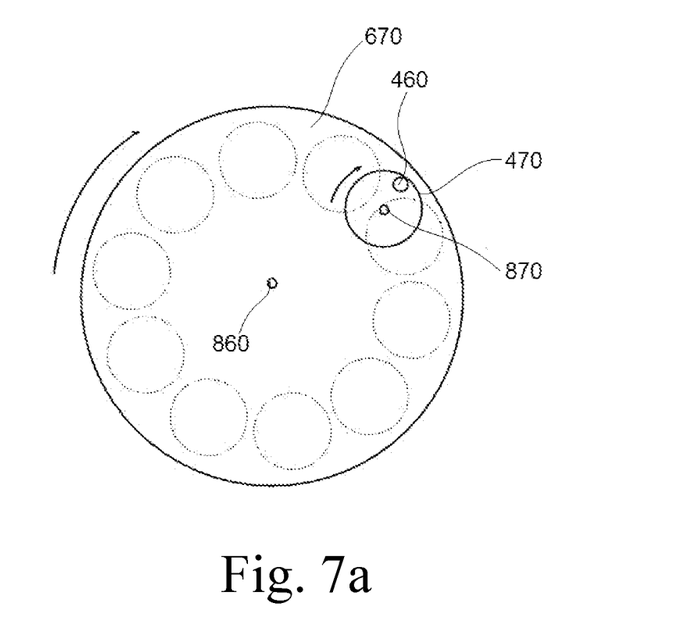
FIGS. 7a and 7b are schematic diagrams illustrating the degrees of freedom of carousels.
Figure 7B:
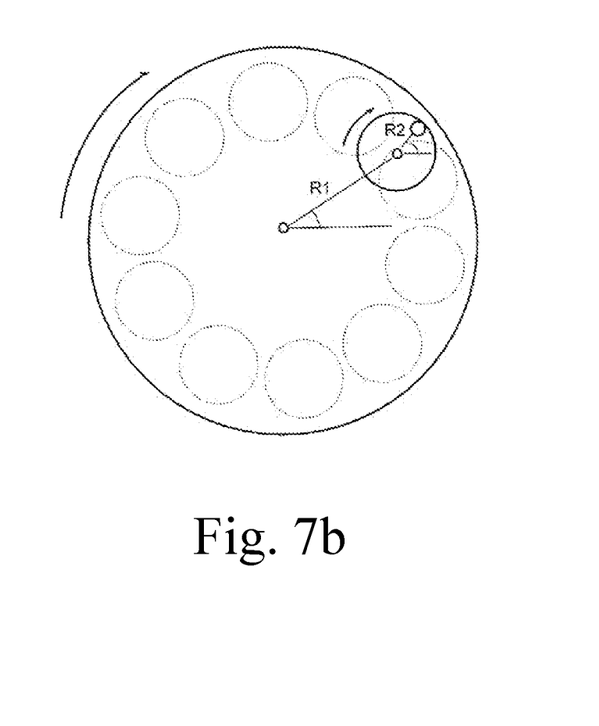

An automatic placement and retrieval system for a gastight sealed cryogenic environment (320) that can place containers in a matrix (710) in the x-y-plane inside a canister (12,000) is shown in FIGS. 4 and 7*a*.

The system is composed of three subsystems: 1) a sealed x-y positioning system that allows aligning the insertion mechanism with the position of the canister in the x-y plane. 2) a compartment (referred as "airlock") (570) connected with two valves, one to ambient and the other to the cryogenic ambient, which is used to insert the biological material to the cryogenic environment without entering along air and moist; and 3) a telescopic cane system (3) that moves linearly in the Z-axis and that is used to hold containers with biological material in order to either place it in or retrieve it from the cryogenic environment (6).

The sealed X-Y positioning mechanism is composed of two subsystems. a) Canister positioning: a full rotation around the axis of the Dewar vessel moves a set of two carousels that contains the canisters. The one at the top (630) has a cut (810) that leaves enough space to allow the telescopic cane to reach the bottom one (670).

An assembly of gears moved by a pair of electric motors (820), (830) with encoder (840) in the external ambient connect to each the carousels by two concentric stainless steel tubes (600), (650) that passes through a retention assembly that is gas-tight sealed (700).

The tubes are kept in place by ball bearings (680, 690) at the neck (360) and inside the outer tube (590).

When one of the electric motors is moving its associated carousel, the other motor is energized to lock the movement of the second carousel.

The inner axis connects to the bottom carousel by means of an aluminum fit bolted to the carousel (660). The outer axis is connected by a second aluminum fit to the top carousel.

The carousels are plates with holes for inserting canisters (410) placed at a radius that coincides with the radius at which the placement and retrieval mechanism 220 is located. The aim of the carousels assembly is to place the desired canister below the inlet port (460) of the placement and retrieval mechanism. The carousels assembly features a float (640) made in styrofoam that is attached to a level indicator (610). In normal operation, the liquid cryogen within the compartment (310) pushes the float and the level indicator to a mark that indicates that the liquid level is correct. The position of the level indicator is read by a camera assembly (450) optimized for operation in cryogenic conditions.

The hatch in which the cryogenic vessel (330) that connects to the placement and retrieval assembly (220) is located on top of the canister lane. The telescopic cane in this assembly is located eccentric to the hatch axis in such a way that half rotation to each side around moves the placement and retrieval port (460) around the different positions of the arc of the circle. This movement is achieved by an electric motor with encoder (500) in the external ambient. This motor engages an inner gear (740) that rotates the placement and retrieval port around a second axis (480) supported by ball bearings. The combination of movements of a) and b) can position the placement and retrieval port collinear to any given position in the lane where the canisters are. FIGS. 8*a* and 8*b* define the movement in this lane which corresponds to the following equations:

$$x = R_1 \cos(\alpha) + R_2 \cos(\beta);$$

$$y = R_1 \sin(\alpha) + R_2 \sin(\beta);$$

Both rotations around axes 860 and 870 are gas-tight sealed. The sealing assembly can vary from a specially designed rubber gasket or o-ring to an o-ring assembly containing two sealant surface.

There are 11 to 20 canisters (410) in Dewar vessel that can be placed under the inlet port by rotating the shafts (600) and (650) from outside Dewar vessel.

The x-y rotation assembly includes a large styrofoam cylinder (470) with an eccentric hole concentric with the telescopic cane used to insert and extract containers. The styrofoam reduces thermal losses and acts as a support for the camera assembly (450). The airlock (570) is composed of at least two-valves that prevent ambient air and moist from entering the cryogenic volume. Airlocks are generally used to move material from one ambient condition to another by matching the conditions in a small volume. For instance, to match ambient pressure to a vacuum chamber, or ambient air to a specific inert gas chamber such as Argon or Helium. A typical airlock configuration includes a vacuum pump or an appropriate gas that is flushed in the space between the two valves to match the ambient of the chamber next to the second valve. In this way the ambient valve is open, the sample entered, and then the valve is closed. The matching condition is then met in the airlock to finally opening the last valve to enter the sample to the second chamber.

In this invention, the airlock is composed of an automatic door (520) that seals the sample space when it is closed by means of an o-ring and acts as the first valve; and automatic spherical valve (850) that connects to the cryogenic environment completes the airlock acting as the second valve.

The automatic door is actuated by an electrical motor (770) that rotates a lead screw (50) that pushes a base (760) connected to centering rods (790) through centering holes (52) in the airlock chassis. The final positions of the door are controlled by an electrical limiter.

The spherical valve is actuated by an electric motor with encoder (490) that uses a bevel gear mechanism to transmit rotation at 90 degrees (730).

The spherical valve is needed because of its property of leaving a circular void where material can be inserted easily.

In the present invention, the matching condition is met by inserting the biological material in a container carrying liquid nitrogen. This liquid nitrogen is responsible to condense the small amount of air left into the minimal volume of the airlock. Hence the nitrogen environment remains free of air and humidity that can cause clog and frost inside the vessel lowering its thermal performance.

The liquid volume of air, which enters the Dewar vessel in each operation is an insignificant amount because the dead volume of the sluice is very low.

In the present invention, the biological material that is stored in the Dewar vessel is contained in containers. Without a latch mechanism, the container would fall down. To avoid that, the airlock further possesses a latch mechanism (750) that keeps the container (420) within the airlock when inserted into it. The latch is activated electrically.

The Z-positioning system is composed of a telescopic cane (560) and a grabbing mechanism that can engage and disengage the samples either magnetically or mechanically.

The telescopic cane is composed of a series of concentric cylinders of decreasing diameter that slide one inside the other. The material of them is stainless steel to reduce heat conduction from ambient to the cryogenic chamber when the system is deployed. The smallest cylinder of the tandem is fixed to a flexible linear gear (550) that runs inside the assembly. The top side of each cylinder has a larger diameter than the bottom side to lock one to the other in order to ensure that after sliding they carry along the next cylinder. The flexible linear gear is actioned by an electric motor (530) with an electrical limit that winds and unwinds it in a sealed enclosure by a set of gears (540). As the flexible linear gear unwinds, it pushes the innermost cylinder which carries along all the consecutive ones.

The innermost cylinder from the telescopic cane has attached to the end a small magnetic cylinder (440) with a diameter larger than the largest cylinder on the assembly. When the aforementioned gear wind the flexible linear gear, the magnetic cylinder pulls up the whole set of cylinders from the telescopic cane by carrying them along one after the other.

The grabbing mechanism in the present invention is magnetic, but it could be electrical or mechanical. A magnet (440) at the end of the cane magnetically couple to a container (430) with a ferrous lid that contains the container.

According to one embodiment, the device comprises a authorization unit (not shown) configured for identifying and allowing manipulation of the containers (420) consented by the patient to be extracted. It consists of an internet service that handles consents. Each sample is associated with an authorized person to make the decision for it. In most cases, the authorized person is the owner of the biological material. When this person is prompt by said a clinic to perform an action over its sample, the system issues a consent form with information relating to the procedure. When the aforementioned person authorizes the procedure by signing the form, the internet service communicates with the placement and retrieval system of the Dewar vessel in which the sample is allocated or is going to be allocated, and transition the system from a stand by into enable state. When the enable state is switched on, the internet service sends a code to the operator. This code is unique for each procedure and when inserted into the system activates the procedure. For instance, for retrieval of a sample a doctor asks to sign a consent form to a patient. When the patient electronically sings it, the placement and retrieval system becomes enable, and a code is received by the authorized operator at the clinic lab. The operator enters the code into the system by means of a code scanner or manually, and the system perform the procedure, in this case, it extracts the indicated sample from the patient.

The whole system needs to be carefully followed in order to diagnose errors and accidents. There are pressure, temperature and level gauges (510, 590 and 620), respectively inside the cryogenic chamber that continuously report the state of the chamber. There are also an external accelerometer, a weight sensor and a camera that report on the manipulation and movement of the system.

These systems report wirelessly through internet to a database that can be consulted by the patients to keep them informed about their biological cells preservation state.

The procedure to place and to retrieve a sample to and from inside the Dewar vessel (210) starts when the system receives the enable signal from an internet service. This is done when an authorized person, usually the owner of the sample, consents to enter the sample into the Dewar vessel. In the enable state an operator receives a unique code associated with the sample generated by the internet service aforementioned. When the code is inserted the system knows which sample position in the matrix (710) to assign or from where to retrieve the container. The system puts the carousel in the position defined by the code through (820) and (830). After that, the motor (490) actuates the spherical valve (850) which opens with the airlock door (520) closed, giving access to the cryogenic chamber, but avoiding input of air and moist. The telescopic cane (560) is then deployed activating motor (530). The magnet (440) picks the specific container (380) and the telescopic cane is sent to a position where the container remains within the airlock (570). Then the spherical valve is closed, the latch (750) engaged and the door opens. The opening of the door disengages the magnet grip by sliding the container laterally. In the case of retrieving a sample, the operator picks up the container, the door is closed and telescopic cane return to stand by position. In the case of a placement, the operator opens the container, places the samples, closes its lid and inserts it into the airlock. The door of the airlock is then closed, the telescopic cane engages the container and the spherical valve is opened again. Finally, the latch is released and telescopic cane inserts the container into the assigned matrix space. The carousel is turned a bit to disengage the magnet by forcing the container laterally and the telescopic cane is retrieved to the top position. The last step consists in closing the spherical valve to return to stand by state.

The invention claimed is:

1. A cryogenic device for storing biological material containers; said device comprising:
   a. a sealed cryogenic Dewar vessel accommodating a liquefied gas in an inner space thereof;
   b. a matrix of receptacles disposed in said inner space and configured for receiving and storing biological material containers;
   c. means for loading and retrieving said biological material containers; said means comprising a telescopic cane manipulator configured for loading and retrieving said biological material containers within said matrix; said means comprising an airlock isolating said inner space from an outer environment surrounding said sealed cryogenic Dewar vessel; said airlock is configured for passing said biological material containers manipulated by said telescopic cane manipulator therethrough in a sealed manner;
   d. wherein said receptacles are carried by a first carousel member rotatable around an axis thereof; said receptacles are arranged into a number of groups distributed over said carousel member; each group of said receptacles has a central point positioned at distance $R_1$ from said rotation axis of said carousel member; a center of each receptacle within said group is positioned around a central point thereof at distance $R_2$;
   e. said telescopic cane manipulator is rotatable around an axis disposed at $R_1$ from said rotation axis of said carousel member on an arm of $R_2$ length such that providing coincidence between said rotation axis of said telescopic cane manipulator with said central point of a receptacle group of interest, a receptacle of interest is loadable or retrievable by said telescopic cane manipulator by rotation thereof around said axis thereof on said $R_2$ arm.

2. The device according to claim 1 comprising a second carousel member having identically arranged receptacles thereon and rotatably mounted under said first carousel member in a coaxial manner; said first and second carousel members are rotatable in an independent manner; said first carousel member has a cut configured for providing an access to said receptacles carried by said second carousel member.

3. The device according to claim 1, wherein at least one said group of receptacles is arranged within a canister releasably connectable thereto said carousel member.

4. The device according to claim 1, wherein said sealed cryogenic Dewar vessel comprises a quick-opening hatch providing an emergency access to said biologic material containers.

5. The device according to claim 1 comprising a level indicator of said liquefied gas further comprising a float and a camera configured for imaging said float.

6. The device according to claim 1 comprising an authorization unit configured for identifying and manipulating said containers conditioning a permission of an authorized person.

7. The device according to claim 1 comprising a cooled head thermally connected to a cryocooler; said cooled head maintains said liquefied gas in a liquid state.

8. The device according to claim 7, wherein said cryocooler comprises pressure and temperature gauges configured for activating and deactivating said cryocooler.

9. A method of loading, storing and retrieving biological material containers; said method comprising steps of:
 a. providing a device for storing biological material containers; said device comprising:
  i. a sealed cryogenic Dewar vessel accommodating a liquefied gas in an inner space thereof;
  ii. a matrix of receptacles disposed said inner space and configured for receiving and storing biological material containers;
  iii. means for loading and retrieving said biological material containers;
 said means comprising a telescopic cane manipulator configured for loading and retrieving said biological material containers within said matrix; said means comprising an airlock isolating said inner space from an outer environment surrounding said sealed cryogenic Dewar vessel; said airlock is configured for passing said biological material containers manipulated by said telescopic cane manipulator therethrough in a sealed manner;
 said receptacles are carried by a first carousel member rotatable around an axis thereof; said receptacles are arranged into a number of groups distributed over said carousel member; each group of said receptacles has a central point positioned at distance $R_1$ from said rotation axis of said carousel member; a center of each receptacle within said group is positioned around a central point thereof at distance $R_2$;
 said telescopic cane manipulator is rotatable around an axis disposed at $R_1$ from said rotation axis of said carousel member on an arm of $R_2$ length such that providing coincidence between said rotation axis of said telescopic cane manipulator with said central point of a receptacle group of interest, a receptacle of interest is loadable or retrievable by said telescopic cane manipulator by rotation thereof around said axis thereof on said $R_2$ arm;
 b. inserting said biological material container into said inner space via said airlock;
 c. cooperatively rotating said carousel member and said telescopic cane manipulator such that said receptacle of interest is available for placing said biological material container within said receptacle of interest;
 d. placing said biological material container within said receptacle of interest;
 e. storing said biological material container within said receptacle of interest;
 f. cooperatively rotating said carousel member and said telescopic cane manipulator such that said biological material container in said receptacle of interest is available for retrieving said biological material container from said receptacle of interest;
 g. retrieving said biological material container from said receptacle of interest;
 h. outing said biological material container from said inner space via said airlock.

* * * * *